C. A. HOWARD.
HOSE-NOZZLE.
No. 188,909. Patented March 27, 1877.
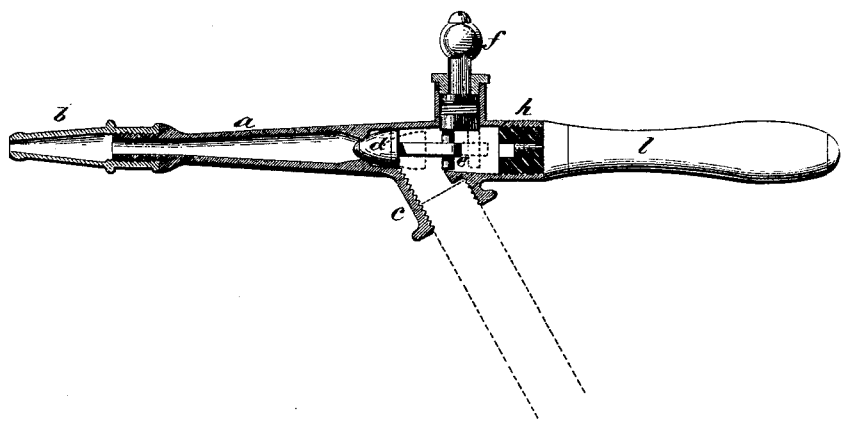

UNITED STATES PATENT OFFICE.

CORNELIUS A. HOWARD, OF NEW HAVEN, CONNECTICUT.

IMPROVEMENT IN HOSE-NOZZLES.

Specification forming part of Letters Patent No. 188,909, dated March 27, 1877; application filed February 20, 1877.

*To all whom it may concern:*

Be it known that I, CORNELIUS A. HOWARD, of New Haven, in the county of New Haven and State of Connecticut, have invented a new Improvement in Hose-Nozzles; and I do hereby declare the following, when taken in connection with the accompanying drawings and the letters of reference marked thereon, to be a full, clear, and exact description of the same, and which said drawings constitute part of this specification, and represent a longitudinal central section.

This invention relates to an improvement in that class of hose-pipes designed for use in the garden and similar small hose, the object being to combine with the pipe a handle for the convenient use of the article. It consists in a pipe constructed with a shank to receive the handle, and with a lateral opening turning into the pipe with a valve between the said lateral opening and the exit, as more fully hereinafter described.

$a$ represents the pipe terminating with the usual nozzle $b$. $c$ is the hose-connection, made transversely or laterally from the pipe, and fitted to receive the hose-coupling. Between the hose-connection $c$ and the pipe $a$ suitable cut-off is arranged, here represented as by a plug, $d$, hung to an eccentric, $e$, in connection with an external head, $f$, by which the valve may be drawn from its seat, as indicated in broken lines, to open the way from the lateral entrance $c$ to the pipe $a$. The pipe extends below the lateral entrance $c$ to form a socket, $h$, which is fitted to receive the handle $l$.

The hose is attached to the pipe in the lateral part $c$ in the usual manner for coupling hose with the pipe. The handle $l$ serves as a convenient means for holding the pipe, and the discharge is regulated by the valve between the lateral entrance and the pipe.

I do not claim an adjustable valve arranged in a hose-pipe so as to move in line with the axis of the pipe, as such I am aware is not new.

I claim—

The herein-described hose-pipe consisting of the pipe $a$, with a lateral or transverse attachment, $c$, and the handle $l$, with an adjustable valve between the lateral entrance and the pipe, all combined substantially as described.

CORNELIUS A. HOWARD.

Witnesses:
J. H. SHUMWAY,
CLARA BROUGHTON.